Patented June 24, 1930

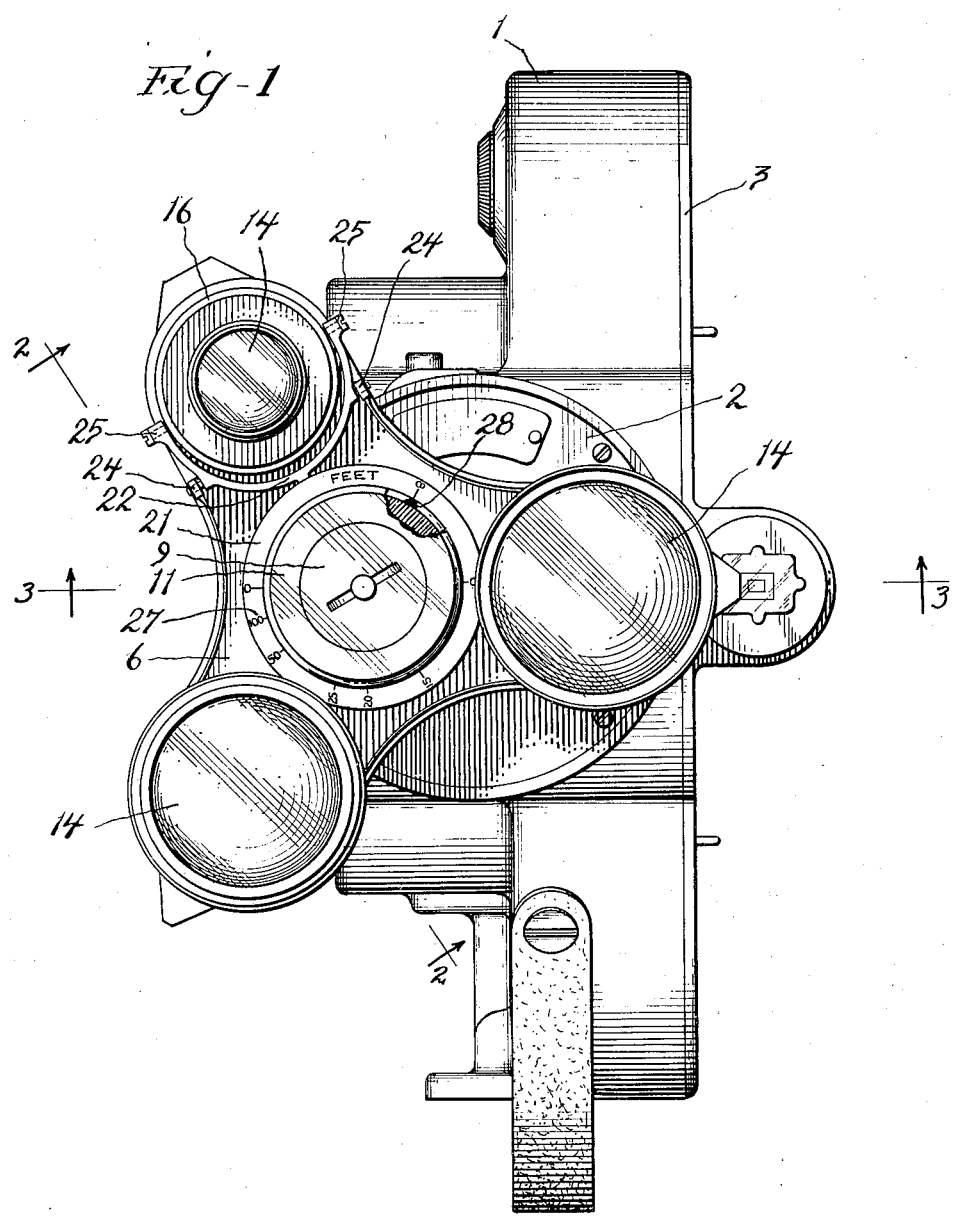

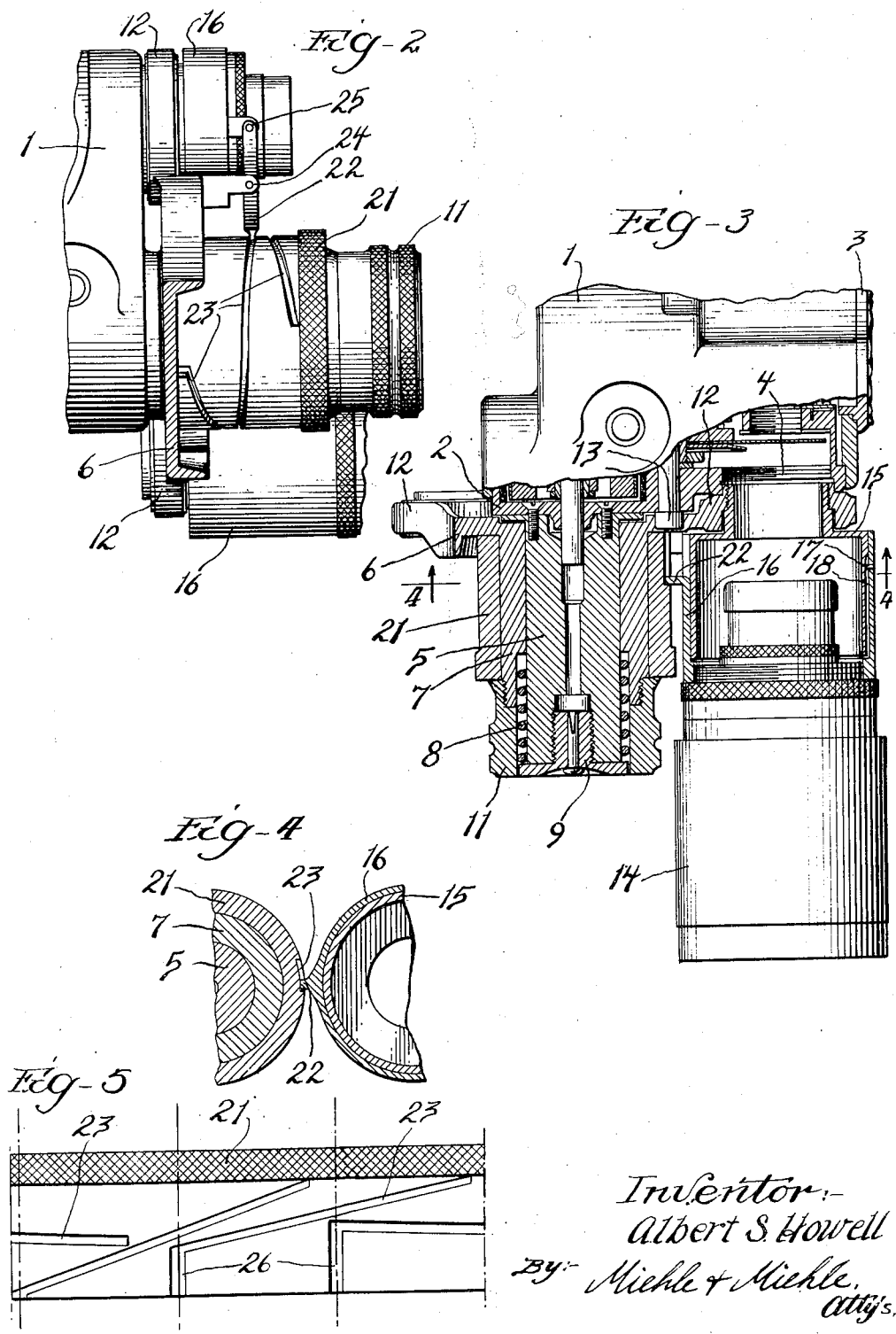

1,767,849

UNITED STATES PATENT OFFICE

ALBERT S. HOWELL, OF CHICAGO, ILLINOIS, ASSIGNOR TO THE BELL & HOWELL COMPANY, OF CHICAGO, ILLINOIS, A CORPORATION OF ILLINOIS

PLURAL-LENS-ADJUSTING MEANS

Application filed November 10, 1928. Serial No. 318,461.

My invention relates particularly to motion picture cameras although not limited to this use alone.

The main object of my invention resides in the provision of a simple and effective means whereby a plurality of selectively functioning adjustable lenses of different characteristics are automatically coordinated as to adjustment for the same condition with a view toward rendering it unnecessary to adjust each lens individually and consequent convenience in the selective functioning of the lenses.

Thus, in a photographic camera, and particularly a motion picture camera, equipped with selectively functioning adjustable photographic lenses of different focal lengths and embodying my invention, a single manual adjustment provides for the adjustment of all of the lenses for a given objective distance, this relieving the user from individually adjusting the lenses for objective distance in the selective functioning thereof.

The above object and certain other objects, hereinafter appearing, are embodied in the preferred form of my invention, hereinafter fully described and illustrated in the accompanying drawings, and are effected by certain novel constructions, combinations, and arrangements of parts particularly pointed out in the appended claims.

In the said drawings,—

Figure 1 is a front elevation of a motion picture camera embodying my invention;

Figure 2 is a partial sectional view of the same on the line 2—2 of Figure 1;

Figure 3 is a partial section on the line 3—3 of Figure 1;

Figure 4 is a partial section on the line 4—4 of Figure 3; and

Figure 5 is a development of the periphery of the single lens adjusting member, hereinafter described.

Like characters of reference indicate like parts in the several views.

Referring to the drawings, 1 designates generally a motion picture camera casing provided with a circular front opening in which is secured a circular front piece 2, and with a side opening which is closed by a door or cover 3. See Figures 1 and 3.

The front piece 2 is provided adjacent the door 3 with a circular light opening 4 disposed on the focal axis of the camera and through which the film in the camera is exposed.

Mounted on the front piece 2 adjacent the side of the camera, opposite that adjacent which the light opening 4 is disposed and projecting forwardly of the front piece in parallelism with the focal axis of the camera, is a stud 5. See Figure 3.

A centrally bored lens carrying member 6 is mounted on the stud 5 for angular movement, this carrying member being provided with an axial forwardly extending hub 7. The carrier member 6 is axially movable on the stud 5, for purposes hereinafter appearing, and is yieldably urged into a rearward position by a helical compression spring 8 encircling the stud 5 and abutting the member 6 and the head of a screw 9 screw-threaded into the forward end of the stud 5.

A sleeve 11 is screwthreaded upon the forward end of the hub 7 and continues the same forwardly and engages the head of the screw 9 for angular and axial movement thereon to provide a further bearing for the carrier member, the sleeve 11 completing the enclosure of the spring 8. See Figure 3.

The carrier member 6 is provided with a plurality of bored lens mount formations 12 spaced about the axis thereof which are adapted to register with and engage in the aforementioned light opening 4 of the front piece 2 in respective angular positions of the carrier member. See Figures 2 and 3.

In angularly adjusting the carrier member 6 it is first pulled forward against the spring 8 to disengage the lens mount formation 12 engaged in the light opening 4, after which the carrier member is moved angularly to register another lens mount formation 12 with the light opening 4 whereupon the carrier member is permitted to move rearwardly under the influence of the spring 8 to engage this lens mount formation with the light opening 4.

A stud 13 on the front piece 2 prevents rearward movement of the carrier member from its forward position between the registering positions thereof and permits rearward movement of the carrier member in its registering positions by engagement in apertures in the carrier member. See Figure 3.

Mounted for axial adjustment in respective of the lens mount formations 12 are a plurality of photographic lenses 14 of different focal lengths, these lenses being mounted in said lens mount formations for axial adjustment in the following manner. See Figures 1, 2 and 3.

Sleeves 15 are screwthreaded rearwardly into respective of the lens mount formations 12, and sleeves 16 are slidably engaged on the sleeves 15, radial pins 17 on the sleeves 16 engaging axial slots 18 in the sleeves 15 to prevent relative angular movement of the sleeves 15 and 16. See Figure 3.

The bodies of the lenses 14 are screwthreaded into the forward ends of respective of the sleeves 18 and, by reason of the sliding engagement of the sleeves 16 on the sleeves 15, are axially adjustable for objective distances.

In order that this axial adjustment of the lenses 14 is automatically coordinated for the same objective distances the following is provided.

A sleeve 21 is mounted for angular movement on the hub 7 of the carrier member 6, this sleeve being axially confined between the main portion of the carrier member and the sleeve 11. See Figures 1, 2, 3 and 4.

Each of the sleeves 16 is provided with a finger 22 which is engaged in respective of a plurality of cam grooves 23 formed in the periphery of the sleeve 21. See Figures 2, 3, 4 and 5. One of the fingers 22 which is associated with the shortest focus lens is in the form of a lever intermediately pivoted on the carrier member 6, as designated at 24, and bifurcated and pivotally connected with the associated sleeve 16 at diametrically opposite points thereof, as designated at 25, in order to prevent cramping of this sleeve on its sleeve 15 by reason of the shortness of the engagement of these sleeves.

The cam grooves 23 on the sleeve 21 are differently pitched in order to coordinate adjustment of the lenses 14 for the same objective distances, the cam groove engaged by the pivoted finger, above referred to being pitched oppositely to the pitch of the remainder of these cam grooves for the reason that this finger, being intermediately pivoted, reverses the movement of its lens.

The inner ends of the cam grooves 23 are provided with axial extending portions 26 extending to the rear end of the sleeve 21 to provide for the assembly of the mechanism.

The forward portion of the sleeve 21 is provided with a scale 27 which cooperates with an index mark 28 on the sleeve 11 for predetermining the adjustment of the lenses 14 for given objective distances. See Figure 1.

Thus, it will be observed that the lenses 14 are adjusted in coordination for the same objective distances by the adjustment of a common adjusting member.

Accordingly, the user having once adjusted the lenses 14 for an objective distance can use the lenses 14 interchangeably for that distance without further adjustment with obvious convenience.

While I have described my invention I do not wish to be limited to the precise details of construction shown as changes may readily be made without departing from the spirit of my invention, but having thus described my invention, I claim as new and desire to secure by Letters Patent the following:

Claims:

1. In a device of the character described the combination with an angularly movable carrier member, of a plurality of axially adjustable lenses carried on said carrier member and spaced about the axis thereof and having their axes disposed in parallelism with the axis of said carrier member, a common angularly movable cam member disposed on the axis of said carrier member, and fingers engaged with said cam member for axially adjusting said lenses in coordination with angular adjustment of said cam member.

2. In a device of the character described the combination with an angularly movable carrier member provided with an axial hub, of a plurality of axially adjustable lenses of different characteristics carried on said carrier member and spaced about the axis thereof and having their axes disposed in parallelism with the axis of said carrier member, a bored adjusting member engaged on said hub for angular movement and provided with cam grooves, fingers engaged in said cam grooves for axially adjusting said lenses in coordination with angular adjustment of said adjusting member, one of said fingers comprising an intermediately pivoted member and the groove engaged thereby being pitched oppositely to the pitch of the remainder of said cam grooves, said cam grooves being differently pitched for automatically coordinating adjustment of said lenses for the same conditions, and index means associated with said adjusting member for predetermining adjustment of said lenses.

It witness whereof I hereunto affix my signature this 3rd day of November, 1928.

ALBERT S. HOWELL.